United States Patent
Cunningham et al.

(10) Patent No.: US 9,239,034 B2
(45) Date of Patent: Jan. 19, 2016

(54) EJECTOR SYSTEM FOR A VEHICLE

(75) Inventors: Ralph Wayne Cunningham, Milan, MI (US); Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 136 days.

(21) Appl. No.: 13/612,177

(22) Filed: Sep. 12, 2012

(65) Prior Publication Data

US 2014/0069534 A1 Mar. 13, 2014

(51) Int. Cl.
| | |
|---|---|
| *F02B 33/44* | (2006.01) |
| *G01M 15/14* | (2006.01) |
| *G01M 15/02* | (2006.01) |
| *F02M 35/10* | (2006.01) |
| *F04F 5/54* | (2006.01) |
| *F02D 29/02* | (2006.01) |
| *F02B 75/12* | (2006.01) |

(52) U.S. Cl.
CPC ......... *F02M 35/10229* (2013.01); *F02D 29/02* (2013.01); *F02M 35/10118* (2013.01); *F02M 35/10157* (2013.01); *F04F 5/54* (2013.01); F02B 2075/125 (2013.01); Y02T 10/144 (2013.01); Y10T 137/8326 (2015.04)

(58) Field of Classification Search
CPC ......... B60T 13/46; B60T 13/48; B60T 13/52; F02B 37/00; F02B 2075/125; F02M 21/04; F02M 35/10229; F02M 35/10118; F02M 35/10157; B60H 1/32; F04F 5/54; F02D 29/02; Y02T 137/8326; Y02T 10/144
USPC ............................ 60/611; 73/112.05, 116.03
See application file for complete search history.

(56) References Cited

U.S. PATENT DOCUMENTS

| | | | | |
|---|---|---|---|---|
| 1,374,491 | A * | 4/1921 | Coulombe | 417/167 |
| 3,949,555 | A * | 4/1976 | Melchior | 60/606 |
| 4,211,200 | A * | 7/1980 | Rocchio et al. | 123/339.13 |
| 4,895,125 | A * | 1/1990 | Geiger | 123/568.11 |
| 4,953,447 | A * | 9/1990 | Bender | 91/514 |
| 6,041,754 | A * | 3/2000 | Mori et al. | 123/339.23 |
| 6,425,356 | B1 * | 7/2002 | Pischinger et al. | 123/90.15 |
| 6,951,199 | B2 * | 10/2005 | Suzuki | 123/339.11 |
| 7,076,952 | B1 | 7/2006 | Vetrovec | |
| 7,353,812 | B1 * | 4/2008 | Gosdzinski et al. | 123/585 |
| 7,634,348 | B2 | 12/2009 | Hirooka | |
| 7,650,221 | B2 | 1/2010 | Oi et al. | |
| 2006/0144046 | A1 * | 7/2006 | Vetrovec | 60/605.1 |
| 2006/0168958 | A1 * | 8/2006 | Vetrovec | 60/599 |
| 2007/0295303 | A1 * | 12/2007 | Hirooka | 123/339.23 |
| 2008/0121480 | A1 * | 5/2008 | Kawamori et al. | 188/356 |
| 2008/0264059 | A1 * | 10/2008 | Hirooka | 60/547.1 |

(Continued)

FOREIGN PATENT DOCUMENTS

| | | | | | |
|---|---|---|---|---|---|
| JP | | 57059022 A | * | 4/1982 | F02B 37/00 |
| JP | | 57210154 A | * | 12/1982 | F02M 21/04 |
| JP | | 2006131003 A | * | 5/2006 | B60H 1/32 |

*Primary Examiner* — Thai Ba Trieu
*Assistant Examiner* — Jason T Newton
(74) *Attorney, Agent, or Firm* — Julia Voutyras; Alleman Hall McCoy Russell & Tuttle LLP

(57) ABSTRACT

A selectively operable vacuum source designed to reduce leakage is disclosed. In one example, the vacuum source is at least partially within an engine air intake system. The approach may reduce a number of sensors required to diagnose whether or not leaks are present within the vacuum source.

18 Claims, 6 Drawing Sheets

(56) References Cited

U.S. PATENT DOCUMENTS

| | | | |
|---|---|---|---|
| 2008/0267789 A1* | 10/2008 | Hirooka | 417/187 |
| 2009/0043477 A1* | 2/2009 | Oi et al. | 701/103 |
| 2009/0273230 A1* | 11/2009 | Wang et al. | 303/122.09 |
| 2009/0320466 A1* | 12/2009 | Vetrovec | 60/602 |
| 2010/0303641 A1* | 12/2010 | Medow et al. | 417/188 |
| 2011/0132311 A1* | 6/2011 | Pursifull et al. | 123/184.56 |

\* cited by examiner

EJECTOR SYSTEM FOR A VEHICLE

BACKGROUND/SUMMARY

Vacuum is a medium for providing actuating force in some vehicles. For example, vacuum may be used to assist a driver to apply vehicle brakes. Vacuum may be sourced to actuators via an engine intake manifold, vacuum pump, or an ejector. Engine intake manifold vacuum may be a suitable vacuum source for naturally aspirated engines; however, there may be insufficient engine intake manifold vacuum for operating vacuum actuators when the engine is turbocharged. Therefore, vacuum may be provided for turbocharged engines via an ejector or a vacuum pump.

An ejector provides vacuum by way of providing a low pressure region in a flow path of a motive fluid. In some examples, the motive fluid may contain fuel vapors, untreated engine emissions, and/or engine crankcase vapors. If the ejector develops a leak, it may be possible for gases to enter the atmosphere. For example, an ejector leak may be manifested in a converging section, a diverging section, or a vacuum or suction section. Since pressure within the converging, diverging, and suction sections may vary significantly, it may require three or more sensors (e.g., a sensor in each section) to determine which, if any, ejector section is leaking. Consequently, it may be expensive and challenging to determine whether or not an ejector is leaking so that the engine control system can detect degradation and alert the driver and potentially take mitigating action. Further, it may be expensive or difficult to meet requirements of regulating agencies for determining if tubes that connect to an ejector have been disconnected.

The inventors herein have recognized the above-mentioned disadvantages and have developed a system for providing vacuum for a vehicle, comprising: an engine including an air intake passage; and a vacuum generating device including a motive fluid inlet section, a diverging discharge section positioned within the air intake passage, and a suction inlet.

By placing a diverging section of an ejector or a venturi within an engine air intake passage, it may be possible to avoid making measurements of the ejector diverging section to detect leaks in the diverging section since any leaks in the diverging section will be released into the closed boundary of the engine. Consequently, hydrocarbons or untreated exhaust gases entrained in the motive fluid, which provides vacuum via the ejector, are directed to engine cylinders where they may be combusted and then treated in the engine exhaust system. Additionally, a particular benefit of arranging an ejector within an engine air intake is that a disconnect or leak in the diverging section outlet may be unnecessary to detect because it is within the engine air intake. A connection at the diverging section is expensive to detect due to a requirement of additional pressure sensors within the diverging section.

The present description may provide several advantages. Specifically, the approach may reduce the need to monitor all sections of an ejector to diagnose the ejector for leaks. Further, the approach may reduce a number of sensors required to monitor an ejector for leaks. Further still, ejector leaks may be determined without adding any additional sensors to the vehicle system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
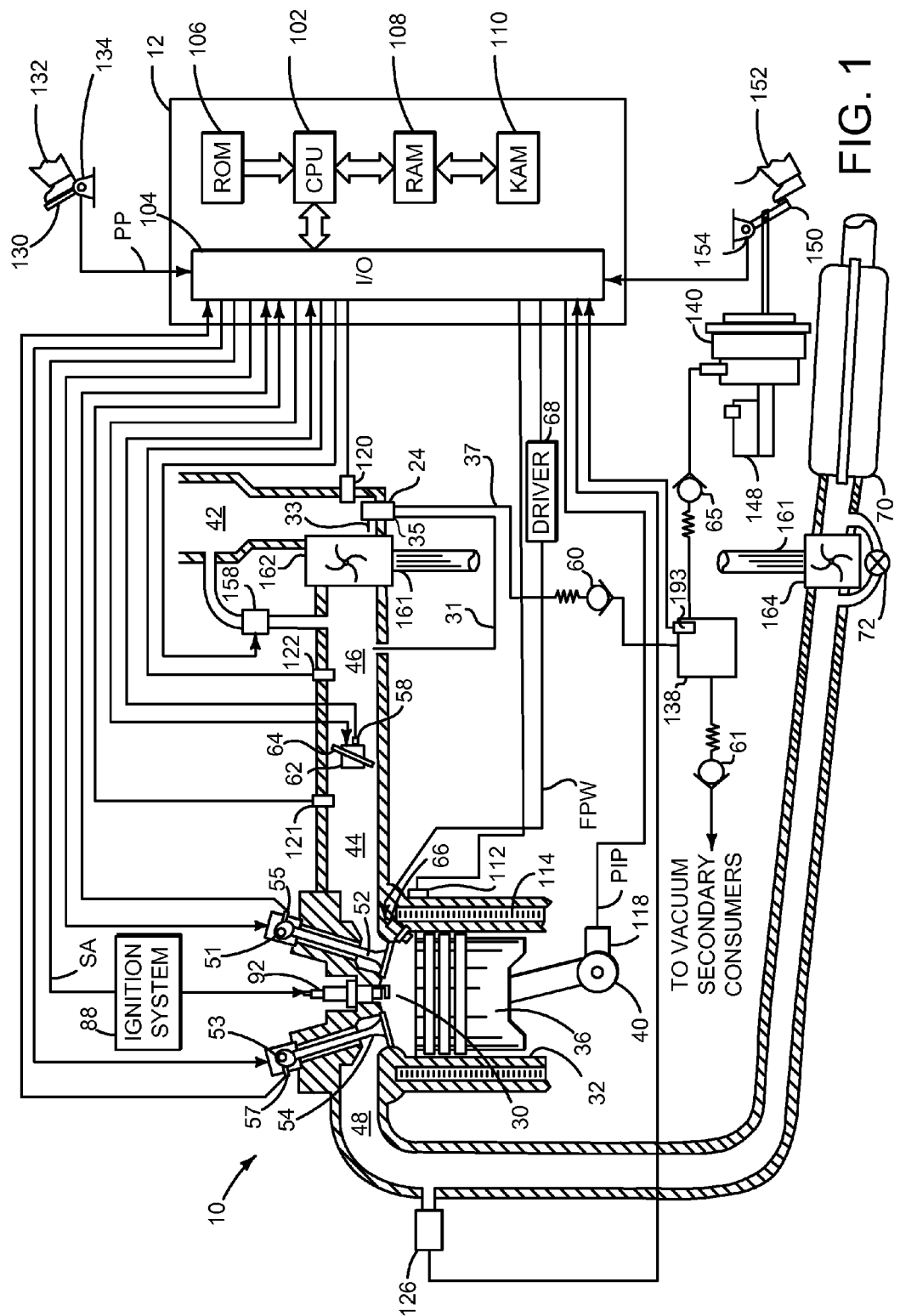
FIG. 1 shows a schematic depiction of an engine.
Figure 2:
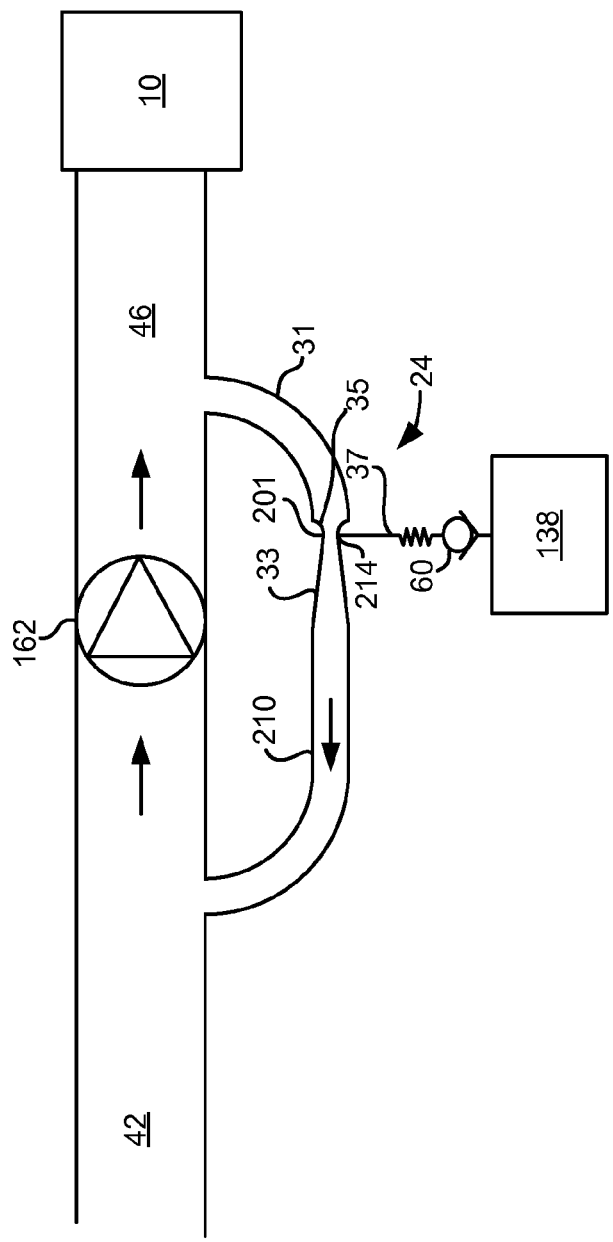
FIG. 2 shows a schematic depiction of a prior art air passage.
Figure 3:
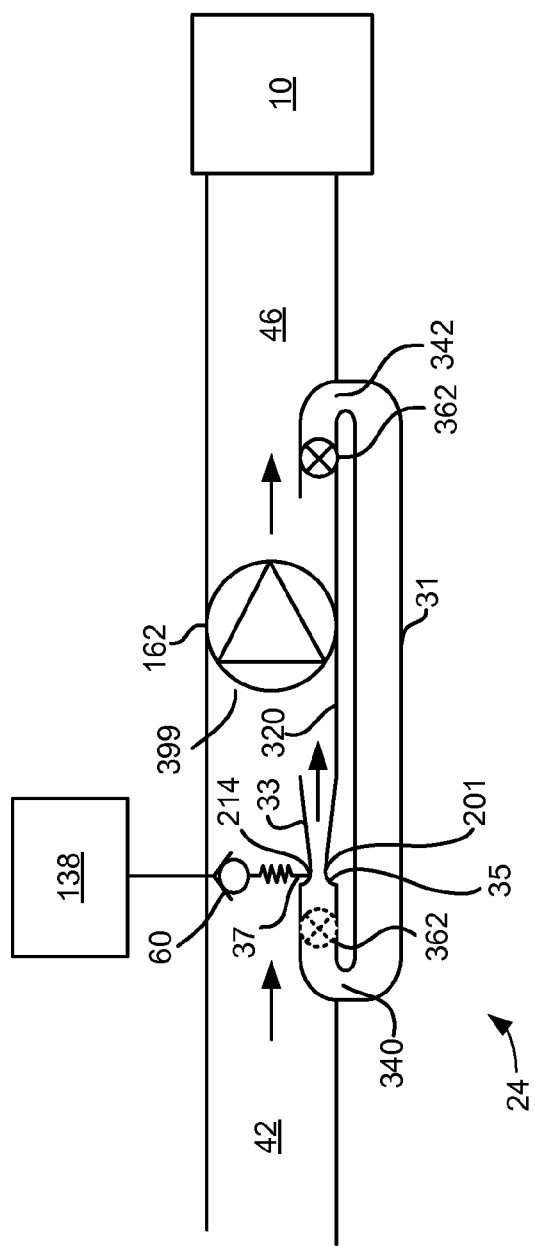
FIGS. 3-4 show example configurations of a vacuum providing device such that it may not be necessary to monitor a diverging section of the ejector or venturi.
Figure 4:
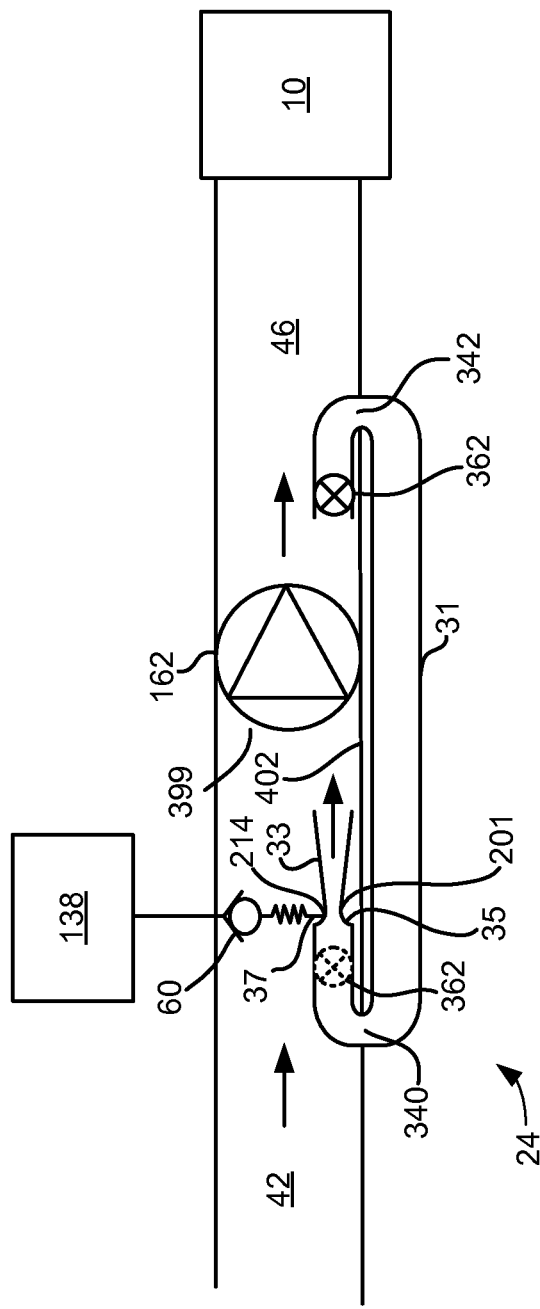

The present description is related to providing vacuum to assists in actuator operation. FIG. 1 shows one example system for providing vacuum for a vehicle. FIG. 2 shows a prior art ejector system that may develop leaks to atmosphere. FIGS. 3 and 4 show example ejector or venturi systems whereby leaks to atmosphere via a diverging section of the ejector or venturi may be avoided. An example ejector and an example venturi are shown in FIGS. 5A and 5B. Finally, a method for diagnosing an ejector or venturi is shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake passage 42 to supply boost chamber 46. Exhaust gases spin turbine 164 which is coupled to compressor 162 via shaft 161. Compressor bypass valve 158 may be electrically operated via a signal from controller 12. Compressor bypass valve 158 allows pressurized air to be circulated back to the compressor inlet to limit boost pressure. Similarly, waste gate actuator 72 allows exhaust gases to bypass turbine 164 so that boost pressure can be controlled under varying operating conditions.

Vacuum is supplied to vehicle systems via vacuum providing device 24. Compressor 162 provides compressed air as a motive fluid via converging section duct 31 to operate vacuum providing device 24. The motive fluid is combined with air from vacuum reservoir 138 via vacuum port duct 37 and check valve 60. Check valve 60 allows flow when the pressure produced via the ejector within vacuum port duct 37 is lower than the pressure within reservoir 138. Mixed air exits at diverging section 33. In some examples, vacuum reservoir 138 may be referred to as a vacuum system reservoir since it can supply vacuum throughout the vacuum system and since brake booster 140 may contain a vacuum reservoir too. Pressure in reservoir 138 may be monitored via vacuum reservoir pressure sensor 193. Vacuum system reservoir 138 provides vacuum to brake booster 140 via check valve 65. Check valve 65 allows air to enter vacuum system reservoir 138 from brake booster 140 and substantially prevents air from entering brake booster 140 from vacuum system reservoir 138. Vacuum system reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from secondary vacuum consumers (e.g., vacuum consumers other than the vehicle braking system) to vacuum system reservoir 138. Brake booster 140 may include an internal vacuum reservoir, and it may amplify force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a schematic depiction of a prior art engine air inlet passage is shown. Engine air inlet passage 42 includes compressor 162 and boost chamber 46. Vacuum providing device 24 includes a converging section 35, a throat 201, a diverging section 33, and a vacuum port 214. A converging section duct or conduit 31 connects boost chamber 46 to converging section 35 of vacuum providing device 24 and provides for fluidic communication between boost chamber 46 and vacuum producing device 24. Vacuum port duct 37 begins at the vacuum port 214 in throat 37 and is connected to vacuum reservoir 138 via check valve 60. Diverging section 33 is in communication with engine air inlet passage 42 via diverging section duct or conduit 210. Diverging section duct 210 provides fluidic communication between diverging section 33 and engine air inlet 42.

The system of FIG. 2 operates as follows. Air flows through compressor 162 in the direction of the arrows. Boost chamber 46 holds air that is at a higher pressure than locations upstream of compressor 162. Air exits boost chamber 46 and proceeds to engine 10 or enters converging section duct 31 leading to vacuum providing device 24. Air that enters converging section duct 31 accelerates through throat 201 where air pressure drops to provide a vacuum that draws air from vacuum port duct 37 via vacuum port 214. Air flows from vacuum reservoir 138 to throat 201 of vacuum providing device 24 via check valve 60. Next, air flows through diverging section 33 and returns to engine air intake 42. Converging section 35 and diverging section 33 are surrounded by atmosphere. A leak may occur in converging section 35 or diverging section 33 such that air and gases within vacuum providing device 24 escape to atmosphere.

In this system, if diverging section 33 is disconnected from engine air intake 42, it creates an engine intake leak. This engine intake leak may be detected using a compressor inlet pressure (CIP) sensor, crankcase pressure sensor, or a crankcase vent tube pressure sensor. For example, at high engine air flows, an air leak around the air filter results in failure to detect an air pressure drop across the air cleaner, and some undesirable gases may be emitted to atmosphere. However, if a small diameter tube is used to couple diverging section 33 to engine air intake 42, a disconnect at either end of the duct 210 remains undetectable. The use of a large diameter (e.g. 12 mm) duct 210 at 42 would solve diagnose-ability at the connection neat the engine air intake 42. On the other hand, use of a large diameter tube from 33 to 42 solves the detection issue. However, the large diameter connectors and tubes create a detectable problem instead of a non-detectable one (e.g., false positive leaks).

Regarding leaks of vacuum, if a disconnected duct or leak occurs between check valve 60 and vacuum reservoir 138, the leak may be determined at this location via a vacuum check at the vacuum user end. For example, a pressure that is higher than is expected in vacuum reservoir 138 may be determined to be a leak.

Regarding leaks of motive fluid supplied to the vacuum producing device 24, if a disconnected duct or leak occurs between boost chamber 46 and converging section 35 along duct 212, such a leak may be determined from an inability to build expected compressor outlet pressure.

Finally, if the disconnect occurs between throat 201 and vacuum inlet 37, it can be diagnosed as failure to increase vacuum in the item in which vacuum is to be created.

Referring now to FIG. 3, a first example configuration of a vacuum providing device such that it may not be necessary to monitor a diverging section for leaks is shown. Engine air inlet passage 42 includes compressor 162 and boost chamber 46 along its length. Vacuum providing device 24 includes a converging section 35, a throat 201, a diverging section 33, and a vacuum port 201. A converging section duct or conduit 31 connects boost chamber 46 to converging section 35 of vacuum providing device 24, and the converging section duct 31 provides for fluidic communication between boost chamber 46 and vacuum producing device 24. Vacuum port 214 begins at a low pressure region of throat 37 and vacuum port duct 37 connects vacuum port 214 to vacuum reservoir 138 via check valve 60. Vacuum port duct or conduit 214 provides connectivity and fluidic communication between vacuum port 214 and check valve 60. Diverging section 33 is positioned within engine air inlet passage 42 so that via diverging section duct or conduit 210 is eliminated.

The system of FIG. 3 operates as follows. Air flows in engine air inlet passage 42 in the direction of the arrows. Compressor 162 receives air at compressor inlet 399 and compresses air in boost chamber 46. Air may exit boost chamber 46 to engine 10 or vacuum providing device 24. Boost chamber 46 includes outlet port 342 where air leaves boost chamber 46 to enter converging section duct 31 leading to vacuum providing device 24. Valve 362 is positioned within boost chamber 46 and it controls air flow through vacuum providing device 24. Alternatively, valve 362 may be located within engine air inlet passage 42 as indicated by the dashed lines. Valve 362 may be variably adjusted to a plurality of positions between full open and full close to adjust air flow through vacuum providing device 24. Converging section 35 directs compressed air to throat 201. In some examples, converging section 35 may also be described as a motive fluid inlet. Air reenters engine air inlet passage 42 via inlet port 340. Air accelerates through throat 201 causing a pressure drop, thereby providing a vacuum source. Vacuum port 214 opens up to a low pressure region in throat 201. Air may be drawn from vacuum reservoir 138 via check valve 60 to throat 210. Air from reservoir 138 and air from boost chamber 46 combine in diverging section 33. In this example, diverging section 33 and engine air inlet passage 42 share wall 320. Atmosphere surrounds engine air inlet passage 42 and converging section 35. Diverging section releases motive fluid (e.g., air) and air from vacuum reservoir 138 directly into engine intake passage 42. Air must pass through wall 320 of engine air inlet passage 42 to exit diverging section 33. Thus, the engine air inlet passage 42 may provide a barrier between diverging section 33 and atmosphere. Consequently, if diverging section 33 develops a leak on the interior side of engine air inlet passage 42, the leak may be constrained by engine air inlet passage 42. However, if a leak develops in wall 320 diverging section 33, undesirable gases may be released to atmosphere from diverging section 33.

Referring now to FIG. 4, an alternative example vacuum providing device is shown. Engine air inlet passage 42 includes compressor 162 and boost chamber 46 along its length. Air flows in engine air inlet passage 42 in the direction of the arrows. Compressor 162 receives air at compressor inlet 399 and compresses air in boost chamber 46. Air may exit boost chamber 46 to engine 10 or vacuum providing device 24. Boost chamber 46 includes outlet port 342 where air leaves boost chamber 46 to enter converging section duct 31. Valve 362 controls air flow through vacuum providing device 24 and it is located within boost chamber 46 so as to provide a seal between boost chamber 46 and converging section duct 31. Thus, valve 362 may be closed to prevent air from leaks in converging section duct 31 from escaping to atmosphere. Alternatively, valve 362 may be located within engine air inlet 42. Valve 362 may be variably adjusted to a plurality of positions between full open and full close to adjust air flow through vacuum providing device 24. Converging section 35 directs compressed air to throat 201. In some examples, converging section 35 may also be described as a motive fluid inlet. Air reenters engine air inlet passage 42 via inlet port 340. Air accelerates through throat 201 causing a pressure drop, thereby providing a vacuum source at vacuum port 214. Vacuum port 214 opens up to a low pressure region in throat 210. Air may be drawn from vacuum reservoir 138 via check valve 60 to throat 210. Air from reservoir 138 and air from boost chamber 46 combine in diverging section 33. In this example, diverging section 33 and engine air inlet passage 42 do not share a common wall. Rather, wall 402 surrounds at least a portion of diverging section 33 and the diverging section 33 of the vacuum providing device 24 is completely enclosed within the engine air inlet passage 42. Atmosphere surrounds engine air inlet passage 42 and converging section 35. Diverging section releases motive fluid (e.g., air) and air from vacuum reservoir 138 directly into engine air inlet passage 42. Air may exit all portions of diverging section 33 and still be retained in engine air inlet passage 42. Thus, the engine air inlet passage 42 completely surrounds diverging section 33 to isolate it form atmosphere. In other words, diverging section 33 is completely within air intake passage 42. Consequently, if diverging section 33 develops a leak, the leak may be constrained from exiting to atmosphere by engine air inlet passage 42.

Figure 5:
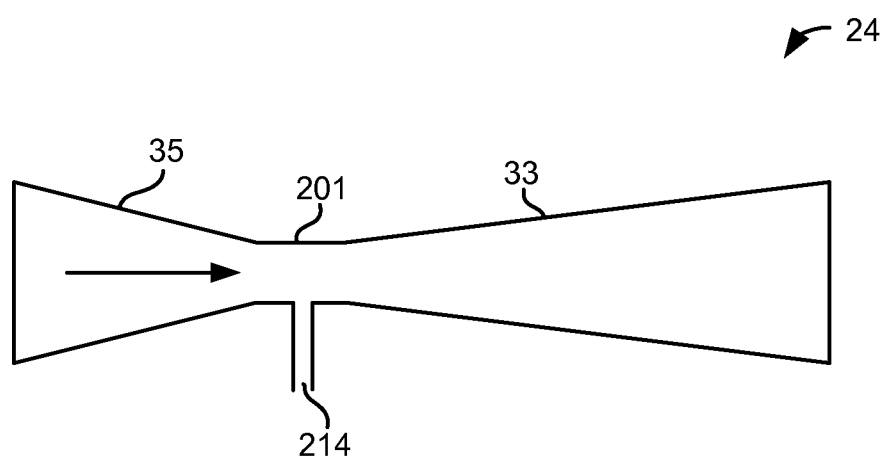
FIG. 5 shows an example venturi or ejector.
Figure 6:
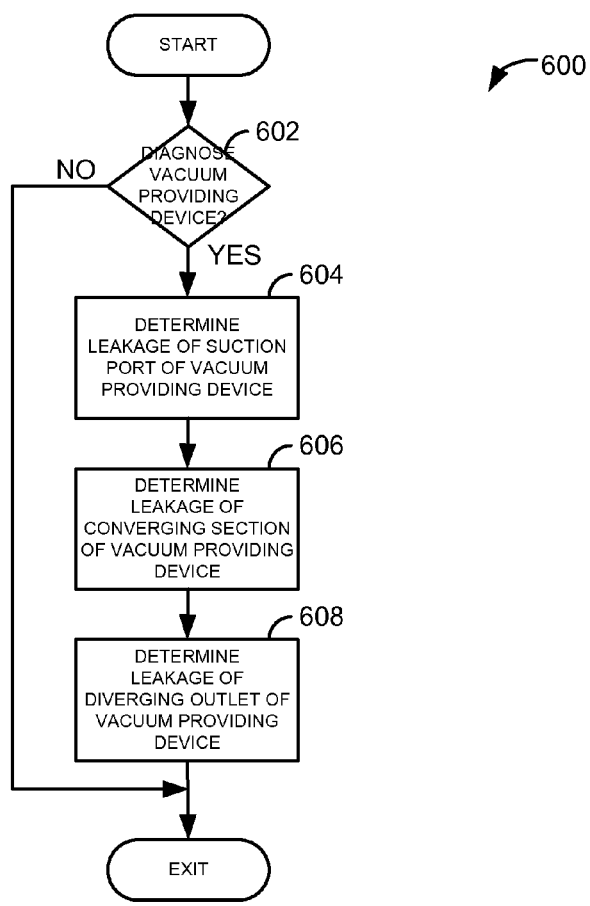
FIG. 6 shows an example method for leak testing a vacuum providing device.

Referring now to FIG. 5, a first example of a vacuum providing device 24 is shown. In this example, vacuum providing device 24 takes the form of a venturi. Vacuum providing device 24 includes converging section 35 (e.g., a motive fluid inlet) where motive fluid arrives at a higher first pressure and is accelerated into throat 201. A second pressure region at a lower pressure than the higher first pressure forms in throat 210 so that air may be drawn into vacuum providing device 24 via vacuum port 214. Motive fluid and air combine and exit vacuum providing device 24 via diverging section 33. In diverging section 33, pressure recovers to a higher third pressure which is a higher pressure than the pressure in the second pressure region.

It should be noted that the presence of valve 362 presents opportunities to improve diagnoses of a disconnected duct as compared to locating valve 362 external to boost chamber 46 or engine air inlet 42. For example, if valve 362 is housed in boost chamber 46, valve 362 may be opened or closed during boost conditions. If a disconnected duct is present at converging section 35, a compressor loss may occur when the valve 362 is open, but not when it is closed. If valve 362 is housed within engine air inlet 42, a lack of CIP vacuum at high air flow may occur if valve 362 is open, but not when valve 362 is closed.

Thus, the system of FIGS. 1 and 3-5B provides for a system that provides vacuum for a vehicle, comprising: an engine including an air intake passage; and a vacuum generating device including a motive fluid inlet section, a diverging discharge section positioned within the air intake passage, and a suction inlet. The system includes where the vacuum generating device is an ejector. The system includes where the vacuum generating device is a venturi.

In some examples, the system further comprises an air compressor positioned along the air intake passage and providing air to the motive fluid inlet. The system includes where the diverging discharge section is positioned upstream of an air inlet of the air compressor. The system includes where the suction inlet is in pneumatic communication with a vacuum reservoir that supplies vacuum to vacuum consumers of the vehicle. The system further comprises a controller, the controller including non-transitory executable instructions to diagnose leaks of the vacuum generating device. The system includes where the discharge section form a portion of a wall of the air intake passage.

The system of FIGS. 1 and 3-5B provides for a system that provides vacuum for a vehicle, comprising: an engine including an air intake passage; a vacuum generating device including a motive fluid inlet section, a diverging discharge section completely positioned within the air intake passage, a throat section completely positioned within the air intake passage, and a suction inlet; and a controller including non-transitory executable instructions to diagnose leaks of the vacuum generating device. The system includes where the controller includes instructions for determining leaks in the motive fluid inlet section and suction, the controller not including instructions for determining leaks in the discharge section. The system includes where the controller includes additional instructions for determining leaks in the air intake passage instead of the discharge section.

In some examples, the system further comprises a compressor positioned along the air intake passage, and where the motive fluid inlet section extends from upstream of the compressor to downstream of the compressor. The system further comprises a valve positioned along a length of the motive fluid inlet section. The system includes where the vacuum generating device is an ejector or a venture.

Referring now to FIG. 6, a method for leak testing a vacuum providing device is shown. The method of FIG. 6 may be stored in non-transitory memory as executable instructions of controller 12 in FIG. 1. The method of FIG. 6 may be applied to a system as described in FIGS. 1, 3, 4, 5A, and 5B.

At 602, method 600 judges whether or not to diagnose a vacuum providing device for leaks. The vacuum providing device may be an ejector or a venturi. The vacuum providing device may be diagnosed for leaks when selected conditions are met. For example, method 600 may judge to perform a diagnostic leak test after a threshold amount of time between vacuum device leak tests has been exceeded. In another example, a diagnostic leak test of the vacuum device may be performed when vacuum is not being produced at a desired rate. If method 600 judges that a diagnostic vacuum device leak test is to be performed, the answer is yes and method 600 proceeds to 604. Otherwise, the answer is no and method 600 proceeds to exit.

At 604, method 600 determines leakage at a suction inlet of the vacuum providing device and at a vacuum line between the vacuum providing device and a vacuum reservoir. In one example, a valve is opened to start flow of a motive fluid through the vacuum providing device. The motive fluid may be air and the air may be compressed via a turbocharger. All vacuum consumers are commanded to a closed state and pressure within the vacuum reservoir is sensed by a pressure sensor. Air is drawn from the vacuum reservoir to the vacuum providing device, provided limited leakage is present. The motive fluid is returned to the engine with air from the vacuum reservoir at a location upstream of the compressor via a diverging discharge section of a vacuum generating device positioned within an engine air inlet. If less than a threshold amount of vacuum develops in the vacuum reservoir, it may be determined that there is a leak at the suction port of the vacuum providing device. Method 600 proceeds to 606 after leak testing of the suction port is performed.

At 606, method 600 determines leakage of a converging section of a vacuum providing device. In one example, a compressor is operated at a steady speed while throttle position is constant and when engine speed is constant. If less than a desired pressure develops downstream of the compressor, it may be determined that there is a leak in the converging section of the vacuum providing device. Further, in some examples, two conditions including pressure less than a threshold downstream of the compressor and vacuum being provided at less than a threshold rate may be conditions for determining leakage of a converging section of a vacuum providing device. Note that for some systems which include an ejector, the converging section may include a chest area of the ejector. Method 600 proceeds to 608.

Note that the suction inlet and converging section may be outside of the engine air inlet so that any leaks in the suction inlet and converging section are exposed to atmosphere.

At 608, method 600 may determine leakage of a diverging section of a vacuum providing device. Alternatively, in some examples method 600 may not provide instructions for determining leakage of the diverging section of the vacuum providing device because the vacuum providing device is positioned within the engine air intake inlet as shown in FIGS. 3 and 4. Since the vacuum providing device diverging section is within the engine air inlet passage, leaks are directed from the vacuum providing device diverging discharge section to the engine air inlet passage. If method 600 includes instructions for determining leakage in the vacuum providing device diverging section, a pressure or flow rate in the engine intake inlet upstream of the compressor may be compared to a threshold engine intake pressure or flow rate at constant engine speed, constant boost pressure chamber pressure, constant throttle position, and constant compressor flow. If the engine intake pressure is less than a threshold pressure or if the engine intake flow rate is greater than a threshold flow rate, method 600 may judge that a leak in the vacuum providing device diverging section is present. In this way, method 600 determines leaks in an air intake passage for determining leaks from the discharge section to atmosphere.

If a leak is determined at 604, 606, or 608, method 600 provides an indication to the driver to service the engine. Further, method 600 may store leak information in memory. Method 600 exits after performing the leak tests.

Thus, the method of FIG. 6 provides a method for providing vacuum for a vehicle, comprising: drawing an amount of air from a vacuum reservoir via a low pressure region of a vacuum generating device; and supplying the amount of air to an engine air intake passage via a diverging discharge section of the vacuum generating device positioned within the engine air intake passage. The method further comprises diagnosing leaks from the vacuum generating device that are outside of the engine air intake passage. The method further comprises providing motive fluid to the vacuum generating device via a compressor. The method includes where the amount of air is provided at a location upstream of an inlet of the compressor. The method further comprises directing leaks from the diverging discharge section to the engine air intake passage. The method includes where the amount of air is combined with air originating from the engine air intake system before being expelled from the diverging discharge section.

As will be appreciated by one of ordinary skill in the art, the methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A system for a vehicle, comprising:
   an engine including an intake passage housing a compressor; and
   a vacuum generating device including a motive fluid inlet section extending from upstream of the compressor to downstream of the compressor, a value positioned along a length of the motive fluid inlet section, a diverging discharge section positioned within the intake passage upstream of an inlet of the compressor, and a suction inlet pneumatically communicating with a vacuum reservoir.

2. The system of claim 1, where the vacuum generating device is an ejector.

3. The system of claim 1, where the vacuum generating device is a venturi.

4. The system of claim 1, wherein the compressor provides air to the motive fluid inlet section via a conduit which connects a boost chamber downstream of the compressor in the intake passage to the motive fluid inlet section.

5. The system of claim 1, where the vacuum reservoir supplies vacuum to vacuum consumers of the vehicle.

6. The system of claim 1, further comprising a controller, the controller including non-transitory executable instructions to diagnose leaks of the vacuum generating device.

7. A system for providing vacuum for a vehicle, comprising:
   an engine including an air intake passage and a compressor housed in the air intake passage;
   a vacuum generating device including a motive fluid inlet section in fluidic communication with the air intake passage downstream of the compressor, a diverging discharge section completely positioned within the air intake passage upstream of the compressor, a throat section completely positioned within the air intake passage upstream of the compressor, and a suction inlet positioned within the air intake passage upstream of the compressor; and
   a controller including non-transitory executable instructions to diagnose leaks of the vacuum generating device.

8. The system of claim 7, where the controller includes instructions for determining leaks in the motive fluid inlet section and suction inlet, the controller not including instructions for determining leaks in the discharge section.

9. The system of claim 8, where the controller includes additional instructions for determining leaks in the air intake passage for determining leaks from the discharge section.

10. The system of claim 7, where the motive fluid inlet section extends from upstream of the compressor to downstream of the compressor.

11. The system of claim 10, further comprising a valve positioned upstream of an engine throttle and along a length of the motive fluid inlet section.

12. The system of claim 7, where the vacuum generating device is an ejector or a venturi.

13. A method for diagnosing vacuum leaks in a vacuum system for a vehicle for providing vacuum for a vehicle, comprising:
   drawing an amount of air from a vacuum reservoir via a low pressure region of a vacuum generating device positioned in an engine air intake during engine operation; and
   supplying the amount of air to an engine air intake passage via a diverging discharge section of the vacuum generating device positioned within the engine air intake passage, the air intake passage housing a compressor, the diverging discharge section positioned in the engine air take passage upstream of the compressor; and
   detecting a leak of the vacuum generating device within the engine air intake and providing an indication of said leak to a vehicle operator.

14. The method of claim 13, further comprising diagnosing leaks from the vacuum generating device that are outside of the engine air intake passage.

15. The method of claim 13, further comprising providing motive fluid to the vacuum generating device via the compressor, and determining leakage of a converging section of the vacuum generating device in response to a pressure downstream of the compressor.

16. The method of claim 15, where the amount of air is provided at a location upstream of an inlet of the compressor.

17. The method of claim 16, further comprising directing leaks from the diverging discharge section to the engine air intake passage.

18. The method of claim 13, where the amount of air is combined with air originating from the engine air intake system before being expelled from the diverging discharge section.

* * * * *